United States Patent [19]

Carey

[11] 4,387,564
[45] Jun. 14, 1983

[54] EXTENDIBLE ROCKET ENGINE EXHAUST NOZZLE ASSEMBLY

[75] Inventor: Lee F. Carey, North Tonawanda, N.Y.

[73] Assignee: Textron Inc., Providence, R.I.

[21] Appl. No.: 193,610

[22] Filed: Oct. 3, 1980

[51] Int. Cl.³ .............................................. F02K 1/08
[52] U.S. Cl. ...................................... 60/242; 60/271; 239/265.33
[58] Field of Search ................. 60/271, 253, 242, 235; 239/265.11, 265.19, 265.33, 265.43

[56] References Cited

U.S. PATENT DOCUMENTS

| | | | |
|---|---|---|---|
| 3,183,664 | 5/1965 | Divone | 60/35.6 |
| 3,270,504 | 9/1966 | Ward | 239/265.33 |
| 3,519,207 | 7/1970 | Clough | 239/265.41 |
| 3,526,365 | 9/1970 | Paine | 239/265.43 |
| 3,685,738 | 8/1972 | Leibach | 239/265.39 |
| 3,711,027 | 1/1973 | Carey | 239/265.19 |
| 3,933,310 | 1/1976 | Hickox | 239/265.43 |
| 3,957,206 | 5/1976 | Mason | 60/242 |
| 4,125,224 | 11/1978 | Carey | 239/265.43 |
| 4,162,040 | 7/1979 | Carey | 239/265.33 |
| 4,169,555 | 10/1979 | Crowe | 239/265.33 |
| 4,184,238 | 1/1980 | Carey | 29/157 |
| 4,213,566 | 7/1980 | Miltenberger | 239/265.43 |
| 4,272,956 | 6/1981 | Lamere et al. | 60/271 |
| 4,313,567 | 2/1982 | Feight | 239/265.33 |

FOREIGN PATENT DOCUMENTS

| | | | |
|---|---|---|---|
| 2903098 | 8/1979 | Fed. Rep. of Germany | 60/271 |
| 1107635 | 3/1968 | United Kingdom . | |

*Primary Examiner*—William R. Cline
*Assistant Examiner*—Donald A. Kearney
*Attorney, Agent, or Firm*—Bean, Kauffman & Bean

[57] ABSTRACT

There is disclosed an improved upper-stage rocket motor/engine assembly of the type which comprises in combination with the basic rocket engine/motor and rigid or fixed nozzle thereof one or more telescoping nestible-extendible truncated cone-shaped collars of rigid structural form, and a further deployable perimetrically attached skirt formed of sheet metal or the like which is pleat-folded inwardly from an initial truncated cone-shaped configuration into a generally planar configuration. The assembly when inoperative is stowed within the basic engine/motor and nozzle profile; but in association with engine/motor firing the extendible components thereof are progressively deployed in accord with an improved technique to provide the desired extended length and plume exiting diameter/area nozzle effect.

10 Claims, 6 Drawing Figures

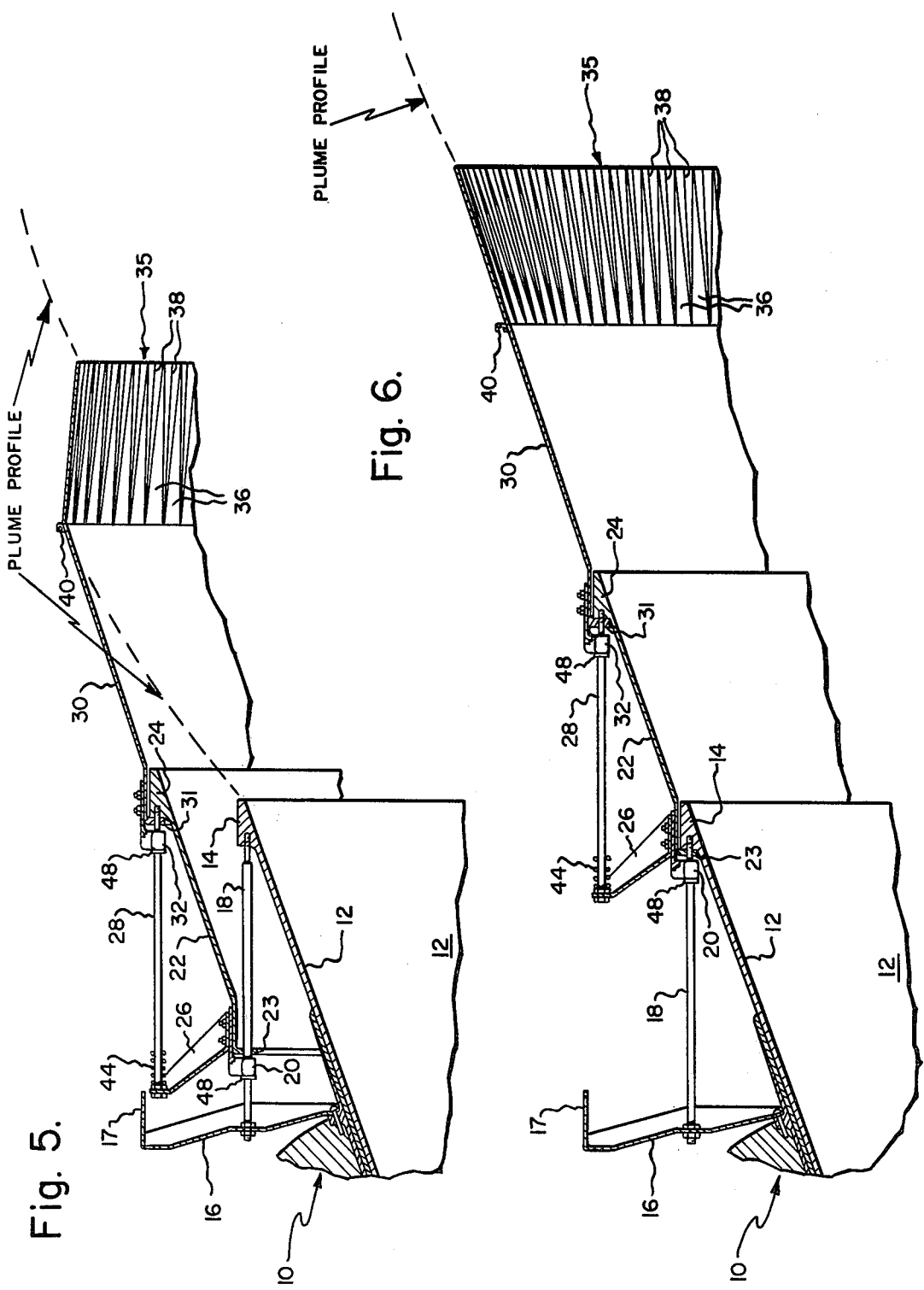

EXTENDIBLE ROCKET ENGINE EXHAUST NOZZLE ASSEMBLY

CROSS REFERENCES TO RELATED PATENTS

This application discloses subject matter relating to the art discussed in U.S. Pat. Nos. 3,183,664; 3,249,306; 3,270,504; 3,275,193; 3,346,196; 3,358,933; 3,482,783; 3,494,513; 3,526,365; 3,561,679; 3,596,465; 3,711,027; 3,784,109; 4,184,238; 4,203,569; and British Pat. No. 1,107,635.

BACKGROUND OF THE INVENTION

Storage of rocket motors and missiles in volume-limited enclosures such as silos, ground transporters, submarine launch tubes and space shuttle cargo bays or the like presents a problem of packaging the high expansion ratio nozzles needed to maximize altitude performance. Use of extendible exit nozzles enables storage of the engines with the extendible nozzles in the stowed position; thereby decreasing the required packaging volume. Upon deployment the extendible nozzle provides a high expansion ratio, high performance nozzle during engine operation.

As explained for example in my earlier U.S. Pat. No. 4,184,238, the nozzle expansion of a rocket engine required for maximum thrust efficiency varies with ambient pressure. In multi-stage rocket engines where a later stage is to be fired in space or at high altitudes, the expansion ratio is of major importance and requires a terminal divergent exit nozzle for the rocket engine of substantial length and exit diameter. However, to make a second or later engine stage of such overall length and diameter as would be required to produce a requisite expansion ratio, would be extremely cumbersome and wasteful of otherwise usable space in the rocket assembly. Thus, it is desirable to provide means associated with a rocket engine so that a divergent nozzle of a length and diameter suitable for maximum thrust at low ambient pressure may be obtained by deploying such means substantially coincidental to firing of the engine. In this way, the inoperative rocket engine and its accessories may be so compacted that the entire assembly requires a storage space no larger than the profile of the basic rocket engine component of the assembly. Whereas the prior art patents referred to hereinabove relate to this same problem, the present invention provides a still more efficient and effectively operating mechanism for the stated purpose.

SUMMARY OF THE INVENTION

In the case of the present invention the rocket engine firing control system initially operates (as by means of explosive bolts or the like) to release pre-compressed springs so as to "kick-start" telescopic extension of a pre-nested cone or collar which terminates in an infolded pleated metal "skirt" fabrication, thereby being operative to start the "drag out" of the other collar member(s) of the previously nested assembly.

The engine fuel combustion plume system then takes over to provide outgoing increased pressures operating against the now-exposed but still partially infolded "skirt" component of the assembly so as to cause it to drag the rigid cone-shaped collar member(s) of the system further outwardly on the guide struts. The assembly then locks into place with the now fully deployed skirt and extended cone components aligned in continuity with the profile of the engine fixed nozzle per se. Thus, there is provided for the engine exhaust plume a further extended composite nozzle configuration having throughout its length an inner surface contour of constant slope. Both the length of the overall effective nozzle and the diameter/area of its exit end are thereby increased; and in consequence the payload/range performance capabilities of the engine at high altitude are extended.

THE DRAWING

Figure 3:
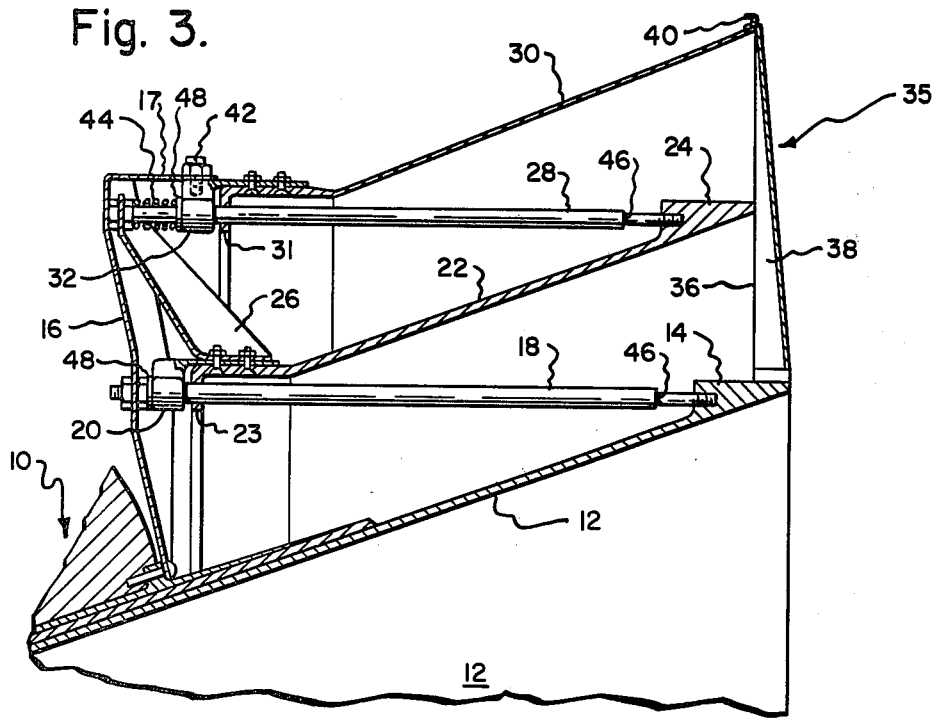
FIG. 3 is a further enlarged fragmentary sectional illustration of a portion of FIG. 1 showing (partially) the engine fixed nozzle; first and second telescopically deployable cone-shaped nozzle "collars", and an infolded sheet metal "skirt" attached to the terminal end of the second deployable collar.
Figure 4:
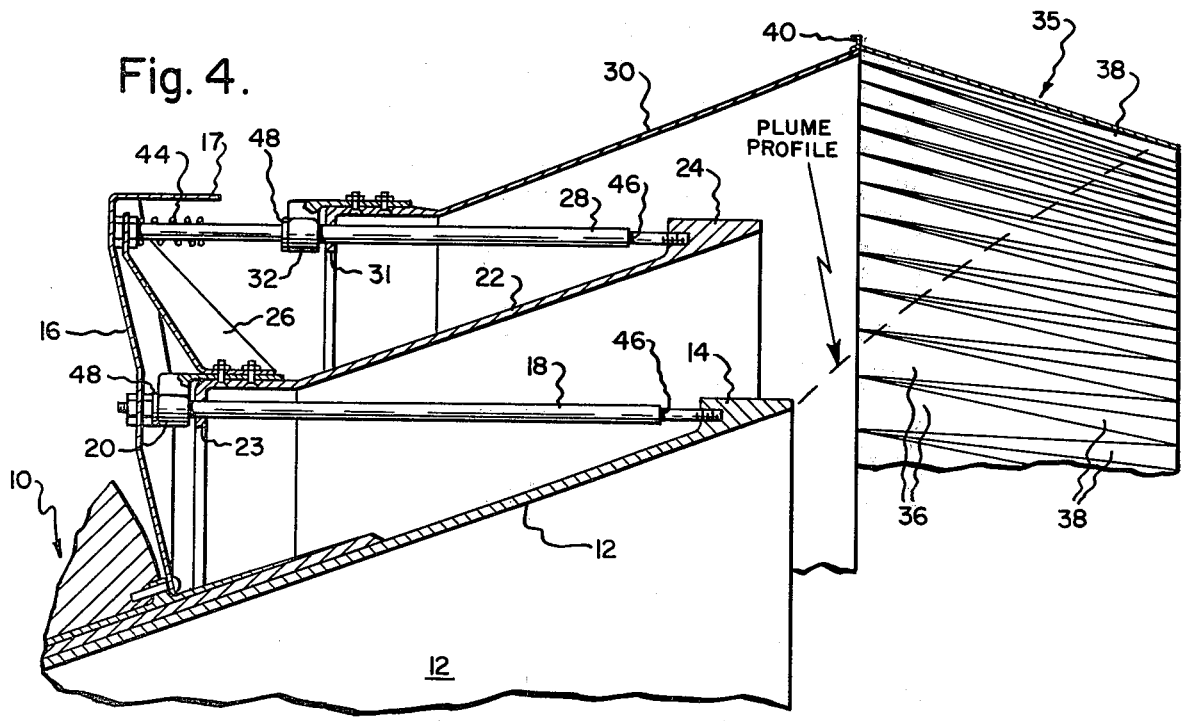

FIG. 4 corresponds to FIG. 3 but shows the second deployable collar as being initially boosted to slide outwardly on its guide rods toward deployed position while at the same time carrying the skirt component of the assembly outwardly into the plume of the engine combustion gas; and also illustrates partial opening of the skirt member of the assembly in response to the blast pressures acting thereon by the engine combustion gases exiting from the fixed engine nozzle;

FIG. 5 further illustrates progress of the deployment operation wherein the second cone member is shown as starting to drag the first cone member outwardly on its guide rods; and FIG. 6 illustrates how the overall assembly finally locks into its fully deployed/extended condition.

DETAILED DESCRIPTION

Figure 1:
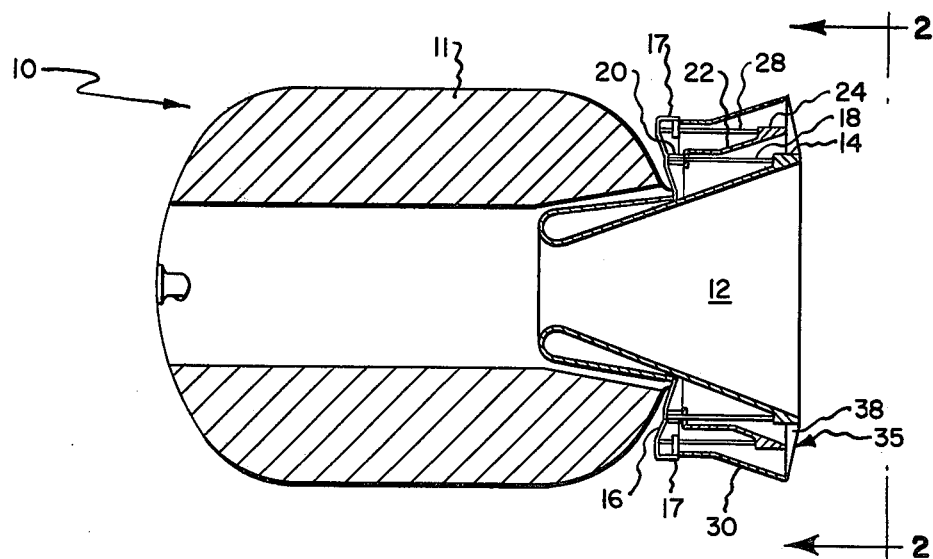
FIG. 1 is a side elevational view schematically and partly in section illustrating a typically configured solid propellant type rocket engine to which is attached a multiple-extendible output thrust nozzle arrangement of the present invention; which is shown as being in its inoperative "stowed" condition within otherwise wasted space inside of the basic engine and nozzle profile.

As shown in FIG. 1, the invention is applicable to a rocket engine casing as is illustrated generally at 10 as having a rocket engine solid type fuel composition packed therein as shown at 11, and a venturi-type rigidly structured exit thrust nozzle 12 integral therewith. As best shown at FIGS. 3-6, the fixed nozzle structure 12 includes at its exit end an outstanding peripheral rim 14, and also intermediately thereof supports in spaced relation therearound by means of radially extending brackets 16, a plurality of guide rods 18. The brackets 16 terminate at their outer ends in downstream extending flanges 17. The guide rods 18 slidably support thereon sleeve brackets 20 supporting a truncated conical shaped collar 22 of rigid structural form whereby the latter is displaceable downstream on the guide rods 18 so as to telescopically extend relative to the fixed nozzle 12 and to ultimately assume a position of continuity therewith as shown progressively at FIGS. 5 and 6.

Whereas in some cases a single extensible cone member as referred to hereinabove may suffice to meet the requirements of a given operation, in other cases additional rigid cones may be called for. Therefore, by way of example herein, the cone member 22 is also shown herein as being formed with an outstanding terminal rim 24 and carries by means of brackets 26 a plurality of guide rods 28 arranged in axially extending parallel relation about the cone member 22. Another cone-shaped collar member 30 is slidably supported upon the guide rods 28 as by means of sleeve brackets 32 so as to be ultimately extendible from its "stowed" position as shown at FIGS. 1 and 3 to its fully deployed position as shown at FIG. 6 in continuity with the fixed nozzle 12 and the extended cone 22. Note that, as best shown in FIGS. 3-6, the cone member 22 terminates at its smaller end in an inwardly bent flange 23 which, upon extension of the cone 22 abuts against the rim 14 extending around the periphery of the fixed nozzle 12. Similarly, the second cone member 30 terminates in an inwardly turned flange 31 which upon extension of the collar 30 abuts against the rim 24 extending about the periphery of the first cone 22, thereby locking the assembly in extended condition.

Figure 2:
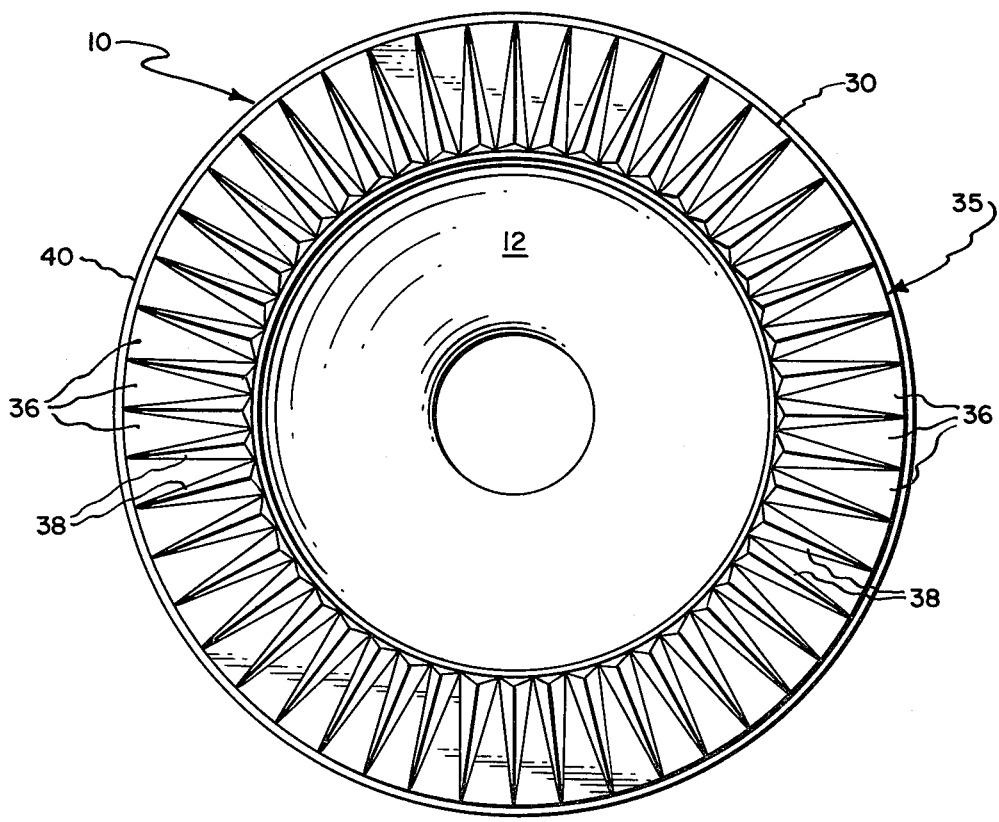
FIG. 2 is an enlarged scale end view of the composite nozzle assembly of the invention when in stowed condition as shown in FIG. 1, taken as suggested by line 2—2 of FIG. 1.

The initially stowed infolded "skirt" member of the assembly as is designated generally at 35 is formed of sheet metal, as taught for example in my earlier U.S. Pat. No. 4,184,238. As shown and explained therein, the workpiece from which the member is formed is first blanked out of sheet metal. It is next creased and then looped and joined together at its opposite end portions into the form of a truncated cone-shaped collar which is simultaneously pleat-folded inwardly on itself into a generally planar configuration comprising a plurality of radially extending flat leaf portions 36 interconnected by folds 38 (FIG. 2 of the drawing herewith). The infolded skirt member is welded or otherwise attached as shown at 40 about its outer rim to the terminal edge of the outermost cone member of the assembly, which in the example illustrated is the collar member 30.

As shown herein, deployment of the extensible nozzle assembly of the invention is initiated by the engine firing control system which activates explosive bolts or the like as shown at 42 (FIG. 3). This releases compression springs 44 which operate to "kick-start" deployment of the outer collar 30 which carries the skirt member 35. The engine fuel combustion plume then takes over to provide the forces necessary to complete the deployment by reason of its impingement and drag forces on the infolded and progressively unfolding skirt member as illustrated by FIGS. 4-6. The assembly then moves into place in fully extended continuity with the profile of the fixed nozzle as shown at FIG. 6, by reason of the cone flanges 23,31 abutting against the rims 14,24 of the nozzle members 12,22. The guide rods 18,28 are shouldered as indicated at 46 (FIGS. 3, 4) and the sleeve brackets 20,32 are provided integral therewith locking means such as latches or snap rings or the like as indicated at 48 (FIGS. 3, 4), which are arranged to snap into the reduced diameter portions of the guide rods against the shoulders 46, for locking the extended assembly in thrust force bearing and gas-sealing condition. In cases where no gas leakage is allowable, a gasket-type seal is fastened to the surfaces of the flanges 23,31 that abut the rims 14,24, such as by adhesive bonding or the like.

Although the drawings depict the invention as being employed in a solid fuel rocket motor, it is obvious that the teachings of the present invention are also applicable to any rocket thruster-nozzle combination, including liquid fuel engines, and the like.

I claim:

1. An extendible rocket thruster exhaust plume nozzle assembly comprising, in combination with a thruster casing having a structurally rigid fixed nozzle extending conically therefrom;
   one or more truncated-cone-shaped collars of rigid structural forms carried by slide support means arranged concentrically about said fixed nozzle, the outermost collar thereof being thereby furthermost extendible downstream of the thruster exhaust plume upon firing of the thruster and deployment of said assembly;
   a further deployable skirt member perimetrically attached to said outermost of said collars, said skirt member comprising an annularly shaped pleat-folded sheet material fabrication of generally planar configuration retracted within the exit profiles of said collars and when so retracted is located out of the plume exhaust profile;
   said collar(s) and said skirt member being nested in compacted relation within the requisite overall profile envelope of said thruster casing and fixed nozzle combination;
   restraint means locking said outermost collar member against deployment relative to said casing nozzle;
   release means operative upon firing of said thruster to unlock said restraint means;
   and force supply means operative upon unlocking of said restraint means to propel said outermost collar to slide on its support means in downstream direction relative to the thruster exhaust plume and to move said skirt member into the exhaust plume profile whereupon said skirt member unfolds in response to fluid pressures thereagainst generated by firing of said thruster.

2. An assembly as set forth in claim 1 wherein said force supply means comprises spring means pre-compressed into spring force stored condition.

3. An assembly as set forth in claim 2 wherein said spring means comprises compression springs slidably biasing said outermost collar relative to its slide support means.

4. An assembly as set forth in claim 3 wherein said springs are compressed between stationary brackets extending from the fixed nozzle and portions of said outermost collar, and wherein said outermost collar is locked against deployment by restraint means interconnecting said stationary brackets and said collar.

5. An assembly as set forth in claim 4 wherein said restraint means comprises explosive bolts responsive to destruct control means.

6. An assembly as set forth in claim 1 wherein said slide support means comprises rods arranged in parallel longitudinally extending and spaced apart relation around said fixed nozzle.

7. An assembly as set forth in claim 1 wherein said skirt member is of generally flat annular form and comprises a fabrication from ductile sheet material having been plastically deformed and pleat-folded along a plurality of crease lines from a frusto-conical shape into a substantially flat annular form.

8. An assembly as set forth in claim 7 wherein said plurality of creases along which said folded skirt has been folded, are straight line creases and include an equal integral number of repeated first, second and third creases.

9. An assembly as set forth in claim 1 wherein said skirt member comprises a workpiece formed of sheet material initially pleat-folded in a manner which permits said skirt to assume a generally annular planar form, and is attached to said outermost collar in a stowed position radially outwardly of and behind the exit end of the thruster fixed nozzle, said skirt device being so formed of thin sheet heat-resistant, substantially non-elastic material as to be adapted to unfold upon thruster firing into a frusto-conical configuration providing a constant slope extension of the fixed nozzle; thereby increasing both the length and diameter of the effective thruster nozzle and skirt combination.

10. An assembly as set forth in claim 1 wherein said force supply means includes the thruster fuel combustion exhaust plume acting on the infolded and progressively unfolding skirt member to produce impingement and drag forces operating thereagainst.

* * * * *